(12) United States Patent
Yu

(10) Patent No.: US 7,254,523 B2
(45) Date of Patent: Aug. 7, 2007

(54) SELECTIVELY REDUCED BI-CUBIC INTERPOLATION FOR INK-JET SIMULATIONS ON QUADRILATERAL GRIDS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 405 days.

(21) Appl. No.: 10/729,637

(22) Filed: Dec. 5, 2003

(65) Prior Publication Data

US 2004/0181384 A1   Sep. 16, 2004

Related U.S. Application Data

(63) Continuation-in-part of application No. 10/390,239, filed on Mar. 14, 2003, now Pat. No. 7,117,138.

(51) Int. Cl.
*G06G 7/50* (2006.01)

(52) U.S. Cl. ............... 703/9; 73/861; 73/488; 702/12; 702/100; 347/1; 347/109

(58) Field of Classification Search ............ 347/1–264; 358/1.9, 534, 1.1, 1.8; 703/9, 2
See application file for complete search history.

(56) References Cited

U.S. PATENT DOCUMENTS

| | | | |
|---|---|---|---|
| 4,797,842 A | 1/1989 | Nackman et al. | |
| 5,459,498 A | 10/1995 | Seccombe et al. | |
| 5,657,061 A | 8/1997 | Seccombe et al. | |
| 5,989,445 A | 11/1999 | Wise et al. | |
| 6,161,057 A | 12/2000 | Nakano | |
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 2002/0046014 A1 | 4/2002 | Kennon | |
| 2002/0107676 A1 | 8/2002 | Davidson | |
| 2002/0177986 A1 | 11/2002 | Moeckel et al. | |
| 2003/0105614 A1 | 6/2003 | Langemyr et al. | |
| 2004/0006450 A1 | 1/2004 | Hale | |
| 2004/0034514 A1 | 2/2004 | Langemyr et al. | |
| 2005/0002589 A1* | 1/2005 | Walmsley et al. | 382/312 |
| 2005/0024394 A1* | 2/2005 | Walmsley et al. | 347/2 |
| 2005/0030565 A1* | 2/2005 | Walmsley et al. | 358/1.9 |
| 2005/0114104 A1 | 5/2005 | Friedl et al. | |
| 2005/0185024 A1* | 8/2005 | Eguchi | 347/65 |
| 2005/0201896 A1* | 9/2005 | Peck | 422/68.1 |
| 2005/0249438 A1* | 11/2005 | Lapstun et al. | 382/313 |
| 2005/0264632 A1* | 12/2005 | Glass et al. | 347/102 |
| 2005/0266582 A1* | 12/2005 | Modlin et al. | 436/164 |
| 2005/0275815 A1* | 12/2005 | Silverbrook | 355/18 |
| 2006/0028516 A1* | 2/2006 | Silverbrook | 347/86 |
| 2006/0055758 A1* | 3/2006 | Silverbrook | 347/103 |

(Continued)

OTHER PUBLICATIONS

Kwan-Liu Ma□□Parallel Volume Ray-Casting for Unstructured-Grid Data on Distributed-Memory Architecture, pp. 23-30, 102-103□□1995 ACM 0-89791-774-1/95/10.*

(Continued)

*Primary Examiner*—Kamini Shah
*Assistant Examiner*—Cuong Van Luu

(57) ABSTRACT

A selectively reduced bi-cubic interpolation on quadrilateral grids for level set re-distancing improves finite-difference-based ink-jet simulation. The "bi-cubic" nature of the interpolation helps the scheme conserve droplet mass. The "selectively reduced" logic prevents the higher-order simulation algorithm from introducing new instability factors.

19 Claims, 15 Drawing Sheets

OTHER PUBLICATIONS

C. L. Bajaj, V. Pascucci□□Visualization of Scalar Topology for Structured Enhancement, pp. 51-58□□0-8186-9176-x/98 1998 IEEE.*

R. Cortez, M. Minion□□The Blob Projection Method for Immersed Boundary Problems, pp. 428-453□□Journal of Computational Physics 161,□□doi: 10. 1006,jcph.2000.6502□□http://www.idealibrary.com.*

I. Tsukanov, V. Shapiro, S. Zhang□□A Meshfree Method for Incompressible Fluid Dynamics Problems□□Apatial Automation Laboratory 2002.*

N. Sukumar, J.-H. Prevost□□Modeling Quasi-static Crack Growth with the Extend Finite Element Method, Part I: Computer Implementation□□International Journal of Solids and Structures 10 (2003) 7513-7537, May 30, 2003.*

Nick Foster, Dimitri Metaxas□□Realistic Animation of Liquids□□Jun. 3, 1996.*

Sethian□□Fast Marching Methods□□SIAM Review, vol. 41, No. 2, 199-235□□1999 Society for Industrial and Applied Mathematics.*

"Projection Method for Viscous Incompressible Flow on Quadrilateral Grids", John B. Bell, et al., AIAA Journal, vol. 32, No. 10, Oct. 1994, pp. 1961-1969.

"A Second-Order Projection Method for the Incompressible Navier-Stokes Equations", John B. Bell, et al., Journal of Computational Physics, vol. 85, No. 2, Dec. 19, 1989, pp. 257-283.

"Computing Minimal Surfaces via Level Set Curvature Flow", David L. Chopp, Mathematics Department, University of California, Berkeley, California, Journal of Computational Physics 106, pp. 77-91, 1993.

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

* cited by examiner

SELECTIVELY REDUCED BI-CUBIC INTERPOLATION FOR INK-JET SIMULATIONS ON QUADRILATERAL GRIDS

CONTINUING/RELATED APPLICATION DATA

This application claims priority under 35 U.S.C. §120 as a continuation-in-part of application Ser. No. 10/390,239, filed on Mar. 14, 2003, now U.S. Pat. No. 7,117,138, and entitled: "Coupled Quadrilateral Grid Level Set Scheme for Piezoelectric Ink-Jet Simulation," the disclosure of which is incorporated by reference herein.

This application is also related to the following applications: application Ser. No. 10/652,386, filed Aug. 29, 2003 and entitled "Consistent Back Pressure for Piezoelectric Ink-Jet Simulation" and application Ser. No. 10/105,138, filed on Mar. 22, 2002, now U.S. Pat. No. 7,085,695, and entitled "A Slipping Contact Line Model and the Mass-Conservative Level Set Implementation for Ink-Jet Simulation." The disclosure of each of these related applications is incorporated by reference herein.

BACKGROUND OF THE INVENTION

1. Field of the Invention

The present invention relates to a model and accompanying algorithm to simulate and analyze ink ejection from a piezoelectric print head. More particularly, the model and algorithm of this invention include a quadrilateral-grid-based, selectively reduced bi-cubic interpolation scheme for re-distancing the level set in ink-jet simulations. The simulation model and algorithm may be embodied in software, hardware or combination thereof and may be implemented on a computer or other processor-controlled device.

2. Description of the Related Art

The level set method is a powerful technique for interface capturing. In the parent application, a rigorous level set projection algorithm on quadrilateral grids was disclosed. That algorithm has been used successfully on ink-jet simulations. The level set is usually initialized as "signed distances" to the interface. However, because the level set convection equation is solved in every time step to update the level set values, the level set usually does not remain as a signed distance function. As a result, the simulation should be stopped periodically and the level set re-distanced. To illustrate this point, consider the rising bubble problem. A fluid bubble is surrounded by a second heavier fluid. The bubble gradually rises and changes its shape due to gravity. The simulation result is plotted in FIGS. 1 (a)–(d), in which the interface (zero level set) is represented by solid lines and the ±0.1, 0.2, 0.3 levels are indicated by dashed lines. It can be seen that the level set gradually distorts as the simulation progresses from t=0 to t=0.4. The distortion of level set from a perfect distance function not only reduces simulation accuracy but also causes a stability problem.

Various algorithms can be applied to re-distance the level set. One idea is to use a standard contour plotting algorithm to determine the interface and then recalculate the level set values. FIGS. 2 (a)–(d) show the result of the rising bubble simulation with this kind of level set re-distancing being performed every ten time steps. It can be seen that the level set basically remains as a signed distance function. However, there are several new problems that arise from such linear re-distancing: (i) the interface may be moved during the re-distancing work; (ii) the work takes a lot of CPU time; and (iii) the work introduces a serious mass loss problem.

OBJECT AND SUMMARY OF THE INVENTION

Objects of the Invention

It is therefore an object of the present invention to provide a level set re-distancing algorithm that avoids the above-mentioned problems.

It is another object of this invention to provide a selectively reduced bi-cubic interpolation technique to re-distance the level set while avoiding the above-mentioned problems.

Summary of the Invention

According to one aspect of this invention, a method for simulating and analyzing fluid ejection from a channel having a boundary between a first fluid that flows through, and is ejected from, the channel and a second fluid, is provided. The method comprises simulating the ejection of the first fluid from the channel using a level set projection algorithm. The algorithm includes creating a quadrilateral grid in a physical space, calculating a transformation matrix for transforming equations derived with respect to the quadrilateral grid for application to a uniform square grid in a computational space, solving equations governing the first and second fluids, and re-distancing, periodically during the simulation, the level set for the first and second fluids by performing selectively reduced bi-cubic interpolation.

In a preferred embodiment, the first fluid is ink, the second fluid is air, and the channel is representative of an ink-jet nozzle designed to be part of a piezoelectric ink-jet head.

Preferably, the ejection simulating step further comprises, after the creating, calculating and solving steps, initializing time, current time step number, and velocity of the first fluid, and setting an interface thickness variable, initializing the level set for the ink-air interface, and calculating an inflow pressure of the ink for the current time step. Preferably, the level set is updated in between the solving and re-distancing steps.

In preferred embodiments, at least one of the grids comprises a plurality of cells. In that case, selectively reduced bi-cubic interpolation is used in the re-distancing step to calculate new level set values at each node within one cell from an interface between the first and second fluids. Further, a triangulated fast marching method is preferably used in the re-distancing step to calculate new level set values at each node not within one cell from the interface.

In another aspect, the invention involves an apparatus configured to carry out the processing described above. The apparatus comprises means for simulating the ejection of the first fluid, e.g., ink, from the channel using a level set projection algorithm. Modules are provided that are configured to perform the appropriate processing as described above. Each module may be implemented in software or hardware. In the latter case, any such module may include one or more of the following: an instruction-based processor (e.g., a central processing unit (CPU)), an Application Specific Integrated Circuit (ASIC), digital signal processing circuitry, or combination thereof Multiple modules may be combined, as appropriate, in any implementation.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

I. Introduction

In its preferred embodiment, the level set re-initialization algorithm of this invention incorporates a quadrilateral-grid-based bi-cubic interpolation, a triangular-grid-based fast marching method, and "selectively reduced" logic. The bi-cubic interpolation feature ensures that the re-distancing procedure does not move the interface (or the zero level) and thereby improves the mass conservation performance. The "selectively reduced" logic prevents this higher-order algorithm from introducing any new instability into the whole simulation algorithm.

Figure 1:
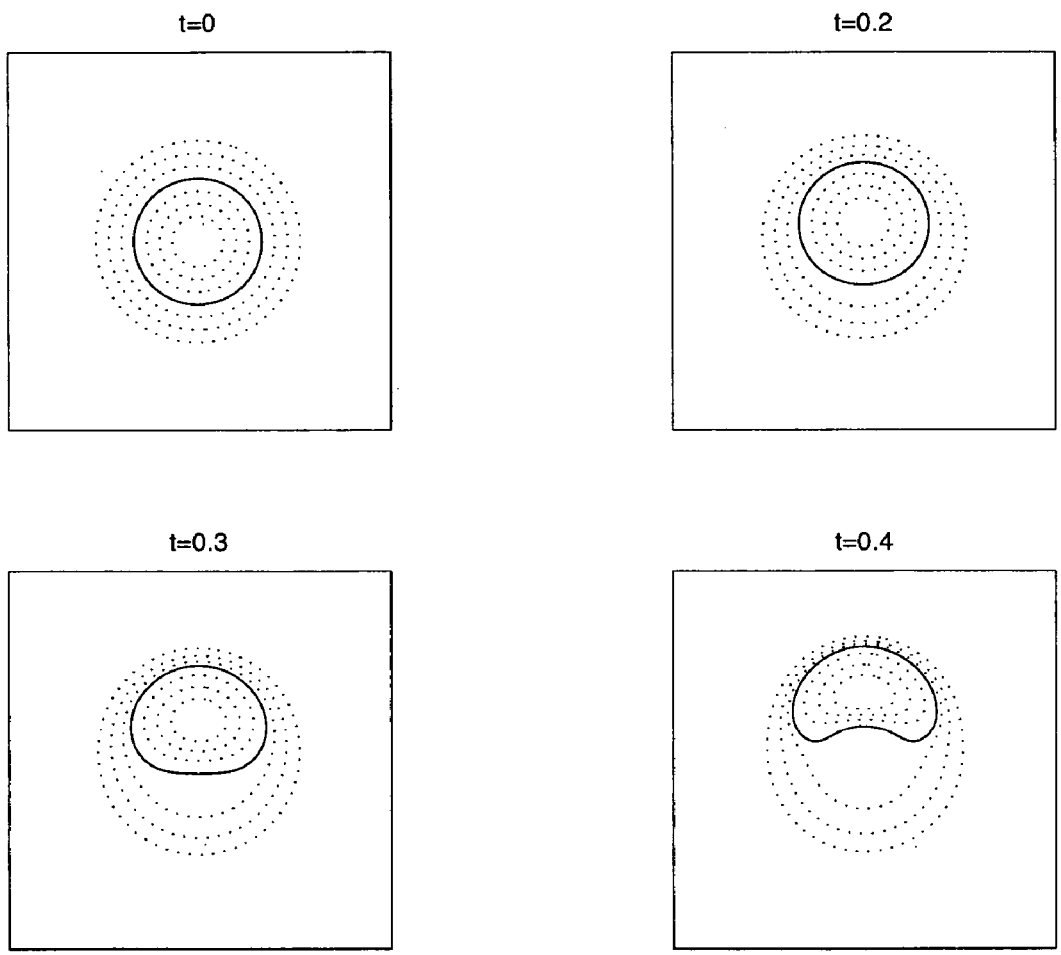
FIGS. 1 (a)–(d) illustrates a simulation of a rising bubble without re-initialization.
Figure 2:
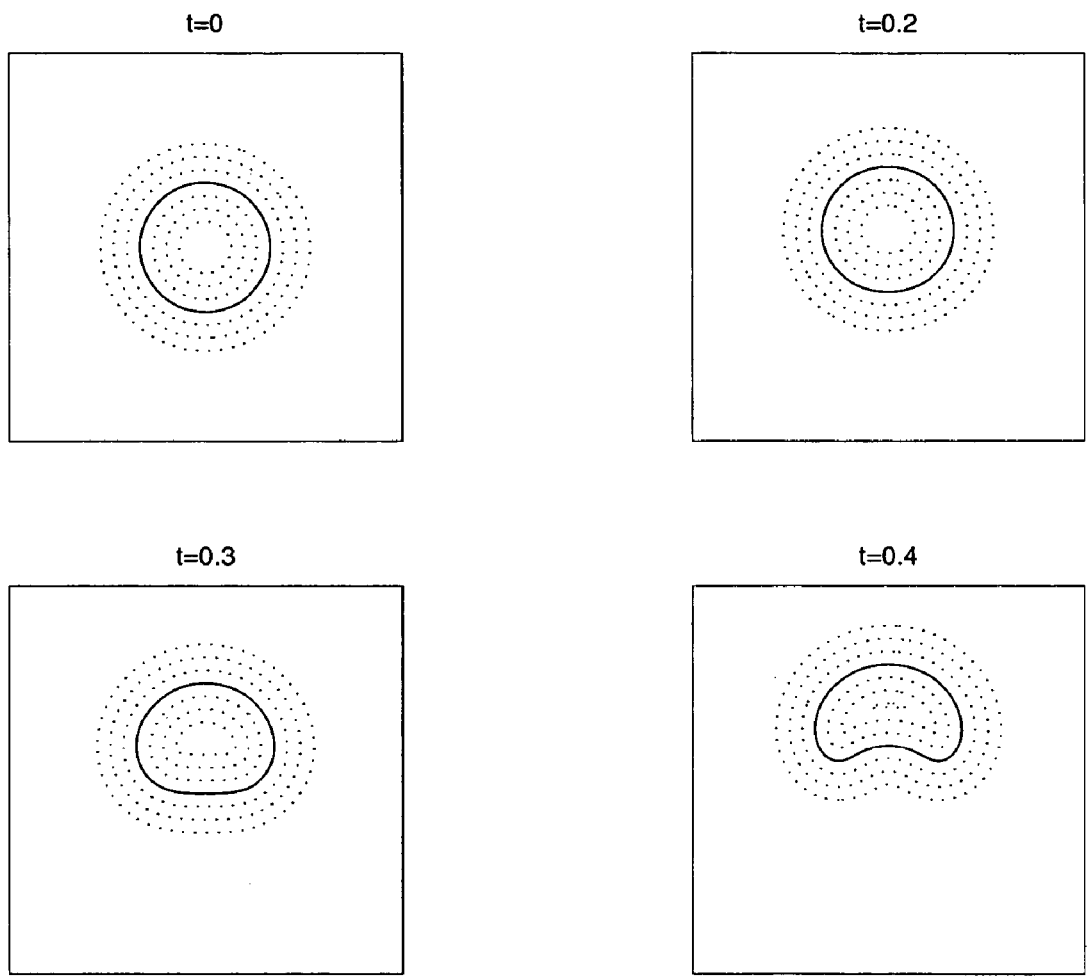
FIGS. 2 (a)–(d) illustrates a rising bubble simulation with re-initialization.
Figure 3:
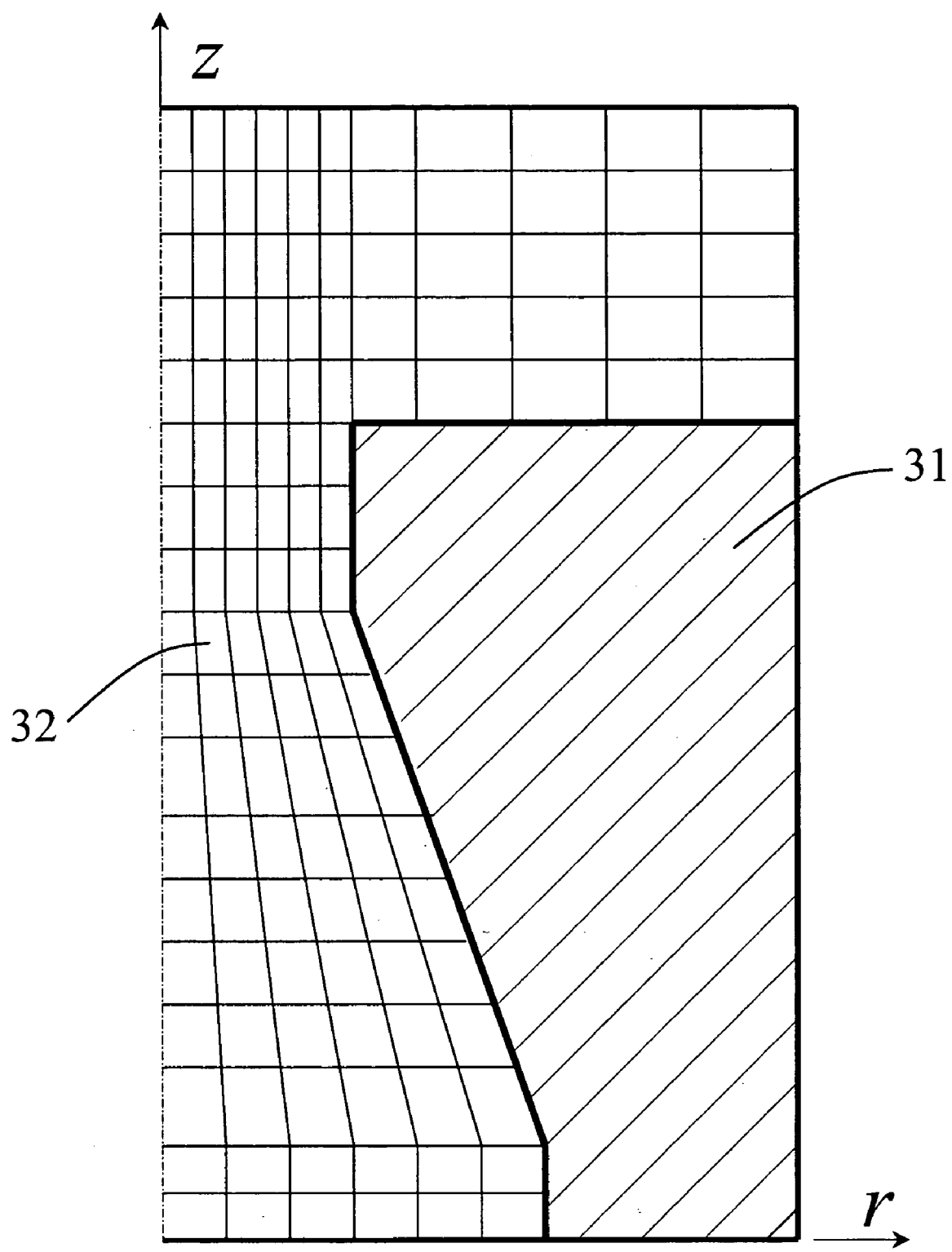
FIG. 3 illustrates an ink-jet nozzle modeled on an axi-symmetric coordinate system and quadrilateral grid.

The level set re-initialization algorithm of this invention is incorporated into models and accompanying algorithms that are designed primarily, although not exclusively, to simulate and analyze ink ejection from a piezoelectric print head. Thus, the invention is described below with reference to an ink-jet nozzle. Since an ink-jet nozzle has an axi-symmetric geometry, the new level set re-initialization algorithm on quadrilateral grids is described using the axi-symmetric coordinate system (r,z). An ink-jet nozzle 31 modeled on such a coordinate system with a quadrilateral grid 32 are shown in FIG. 3.

II. Level Set Re-initialization

A. Bi-cubic Interpolation

Figure 4:
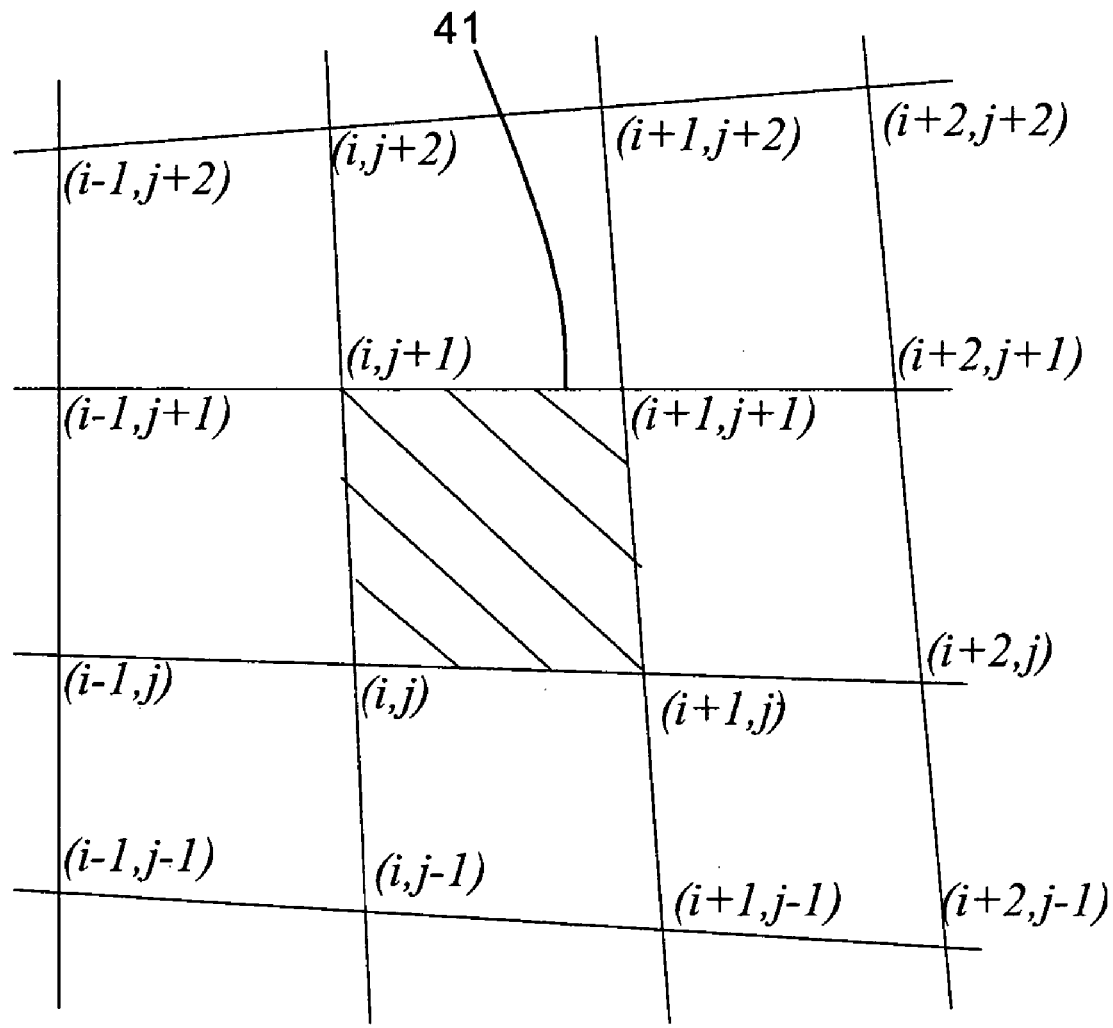
FIG. 4 illustrates a central grid cell and surrounding grid cells that are used for the level set re-initialization of the central grid.

Referring to FIG. 4, for a central cell 41 a local bi-cubic interpolation function $f(r,z)$ from which the zero level can be accurately solved is constructed. Such a bi-cubic function is shown in equation (1), which is set forth in the Appendix along with the other numbered mathematical relationships referenced in the following discussion. Equation (1) is such that it satisfies the equations in (2) where k and l are defined as set forth in (3). Note that there are 16 coefficients to determine in the bi-cubic interpolation function $f$ and there are exactly 16 conditions in the equations in (2). To obtain the values of $$\left(\frac{\partial \phi}{\partial r}\right)_{k,l}, \left(\frac{\partial \phi}{\partial z}\right)_{k,l}, \text{ and } \left(\frac{\partial^2 \phi}{\partial r \partial z}\right)_{k,l}$$

on the quadrilateral mesh, the metric matrix and the Jacobian associated with the mesh, as shown in equation (4), are used. So, for example, at the grid point (i,j) in FIG. 4, the first-order derivatives are as shown in equation (5) with the various parameters as defined in (6). The second-order derivative is as shown in equation (7), where at (i,j) the relationships in (8) hold true.

For the level set re-initialization using bi-cubic interpolation, one has to interpolate in all of the cells that the zero level passes through and then solve for the new level set values for the four nodes of each of those cells. Suppose the central grid cell 41 contains a segment of the zero level. Then the interpolation is done using equations (1) through (8). The remaining task is to solve the new distance for (i,j), (i+1,j), (i,j+1), (i+1,j+1).

Let $x^0$ be a node of the central cell 41 where the distance to the zero level is to be computed. Let y be a point on the zero level nearest to $x^0$. Thus, the relationships in (9) are obtained. To solve (9) for the closest point y, Newton's method can be used, as shown in (10), where k=0,1, 2, . . . . The iteration is continued until the inequality in (11) is satisfied.

Note that, in order to construct the bi-cubic interpolation function in (1) for a given cell, a total of 16 $\phi$ values on nodes surrounding that cell is needed. Hence, for grid cells immediately adjacent to the solution domain boundary, the bi-cubic interpolation should be reduced to a bi-linear interpolation as shown in (12). The bi-linear interpolation consists of four unknown coefficients. Hence, only the $\phi$ values at the four nodes of the cell are needed to construct the interpolation.

B. Fast Marching on Triangulated Grids

To re-initialize the level set, the level set $\phi_{i,j}$ has to be re-calculated without changing the position of the zero level. In the so-called "fast marching method," this is done by solving equation (13) with the current interface position being the boundary condition.

With reference to the text: "*Level Set Methods and Fast Marching Methods*" by James A. Sethian, second edition, Cambridge University Press, 1999, the numerical scheme defined in equation (14) is used to solve equation (13) on a rectangular grid where the D parameters are defined as set forth in (15). Note that $D_{ij}^{-y}\phi$ and $D_{ij}^{+y}\phi$ are defined similarly to the respective x components. The key to the fast marching method for solving equation (13) lies in the fact that the upwind discretization (14) possesses a specific "causality" relationship, i.e., when $\phi_{i,j}$ is computed, it is only affected by its neighbors ($\phi_{i+1,j},\phi_{i-1,j},\phi_{i,j+1},\phi_{i,j-1}$) with small set values. The fast marching method for re-initializing the level set on rectangular grids works by executing the following algorithm for grid points with positive level set and negative level set separately.

First, tag points in the initial conditions as "accepted." Then tag as "considered" all points one grid point away and compute values at these points by solving (14). Tag as "far" all other grid points. For level set re-initialization using "bi-cubic interpolation," those grid points with distance values calculated from the interpolation are the initial conditions and are tagged as "accepted" to start the fast marching. The loop is described below.

1. The loop begins. Let "trial" be the point in the "considered" group with the smallest value of $\phi$.
2. Tag as "considered" all the neighbors of "trial" that are not "accepted." If the neighbor is in "far," remove it therefrom and add it to "considered."
3. Add "trial" to "accepted," and remove it from "considered."
4. Recompute the $\phi$ value for all the "considered" neighbors of "trial" by solving (14).

The points in the initial condition are just those nodes with new $\phi$ values computed using the bi-cubic interpolation. The key to the efficiency of the fast marching method is on the handling of the "considered" set using the minimum heap. A minimum heap is a "binary tree" with the property that the value at any given node is less than or equal to the values at its child nodes. Further discussion regarding minimum heap can be found in the Sethian text referenced above.

Figure 5:
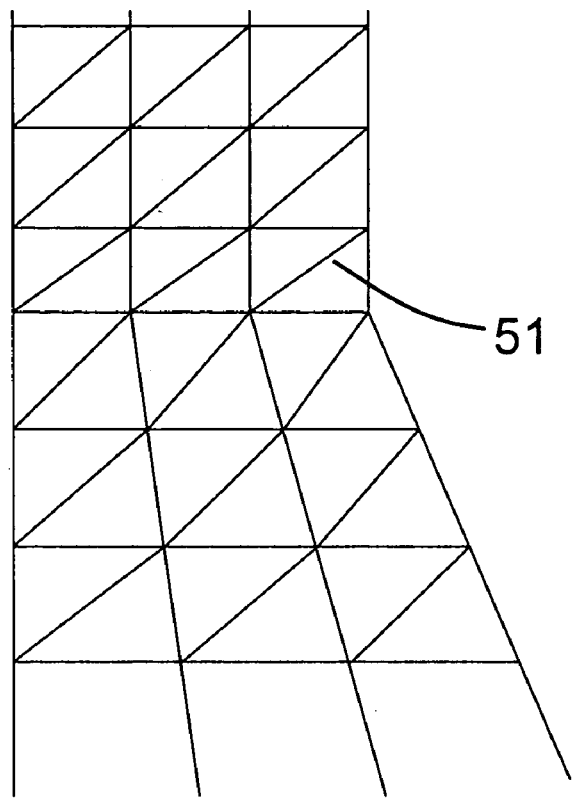
FIG. 5 illustrates a triangular grid on which the fast marching method for re-initializing the level set can be carried out.

The above fast marching method does not work on quadrilateral grids. However, the fast marching method has been extended to triangular grids. To be able to use a version of the triangular fast marching method, the quadrilateral grid is changed to a triangular grid 51 as shown in FIG. 5.

Figure 6:
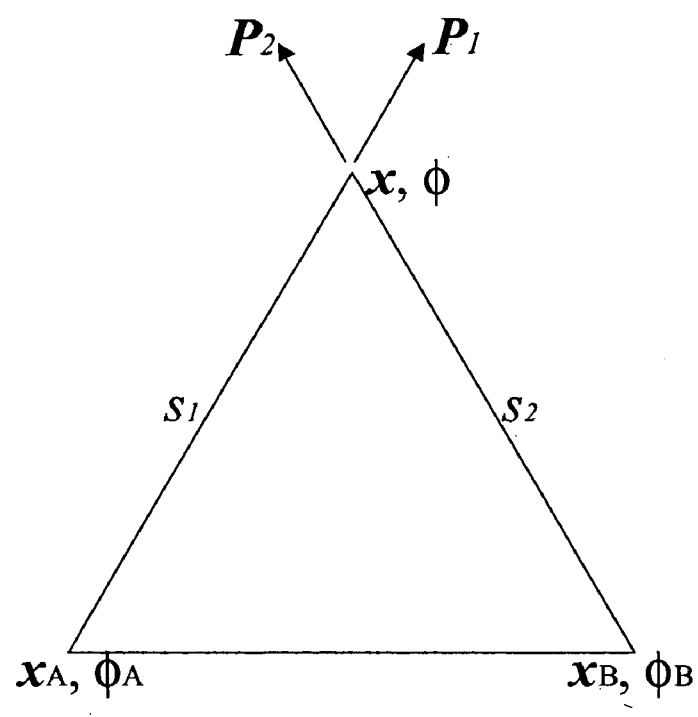
FIG. 6 illustrates a triangular cell in a triangular grid.

Referring to FIG. 6, suppose the $\phi$ value at $x_A$ and $x_B$ are "accepted" or "considered," and the $\phi$ value at x is to be calculated. The triangular discretization set forth in equation (16) is used to do the calculation with various parameters defined as per (17). When solving equation (16), the "upwind" conditions shown in (18) must be satisfied. The reason for solving equation (16) on triangular grids for $\phi$ is as follows. Suppose the direction derivatives $v_1, v_2$ at x are available in directions $P_1, P_2$. At x, the equations in (19) are satisfied. Since $|\nabla\phi|=1$, $\nabla\phi\cdot\nabla\phi=1$. Hence, the equations in (20) are obtained. At x, the simplest evaluation of $v_1$ and $v_2$ is shown in (21). By substituting (21) into the last equation of (20), equation (16) is obtained.

III. Selectively Reduced Logic

To ensure code stability and avoid introducing artificial effects during the re-initialization, the bi-cubic interpolation is selectively reduced to the bi-linear interpolation in a particular cell if: (1) that cell is right next to the domain boundary; (2) the local fluid acceleration is high; or (3) the interface has a sharp corner in the cell. In ink-jet simulations the interpolation usually only needs to be reduced to bi-linear in a few cells. Hence, the accuracy of level set re-initialization is still third-order in the vicinity of the interface.

A. Next to Domain Boundary

If the interface goes through a cell which is right next to the boundary of the solution domain, the bi-cubic interpolation cannot be used. One reason is that 16 conditions are needed to construct the bi-cubic polynomial but there are fewer than that in the cells immediately adjacent to the boundary. Another reason is that doing bi-cubic interpolation at boundary cells tends to push the interface away from the domain boundary. Using the bi-cubic interpolation immediately adjacent to the axis of symmetry usually results in a very long droplet that does not pinch off, which violates the physics of capillary instability.

B. High Local Fluid Acceleration

Considering that the level set projection scheme on quadrilateral grids employed with this invention is explicit in time, the time step $\Delta t$ is constrained by the Courant Friedrichs Lewy or CFL condition, surface tension, viscosity, and local fluid acceleration, as set forth in equation (22), where $h=\min(\Delta r,\Delta z)$ is the smallest cell dimension and F is defined in the parent application. It can be seen that the constraints from the surface tension and viscosity can be determined at the beginning of a simulation because they depend only on the mesh size and fluid properties. The CFL and local fluid acceleration should be checked every time step and for every cell. Hence, for code implementation, an initial time step size $\Delta t_0$ is determined by the surface tension and viscosity constraint set forth in equation (23). In each time step it is compared to the constraint from the CFL and local acceleration as set forth in equation (24). The smaller of these two will be used as the actual time step size, as indicated in equation (25). The basic rule for deciding whether to reduce bi-cubic interpolation to bi-linear in a given cell (i,j) is: if either the CFL or the local acceleration constraint in the cell is smaller than $\Delta t_0$, use the bi-linear interpolation for level set re-initialization instead of the bi-cubic interpolation.

C. Interface Sharp Corners

When the interface has a sharp corner in or close to a cell, the curvature evaluated at the four nodes of that cell tends to be high. On quadrilateral meshes, the curvature can be calculated by equation (26). All of the derivatives in the above formula can be numerically calculated in the computational space and by the use of central difference. For example, considering the central cell 41 in FIG. 4, if the curvature at node (i,j) is to be calculated, equation (27) may be used.

To decide whether a curvature is too high, use the critical value as determined by equation (28) where s is the extent of interface smearing defined in the parent application. Hence, the rule is: if at least one curvature at the four nodes of the cell is bigger than $\kappa_{critical}$, i.e., if equation (29) is satisfied, the bi-linear interpolation should be used in the cell instead of the bi-cubic interpolation.

IV. Flow Charts

Figure 7:
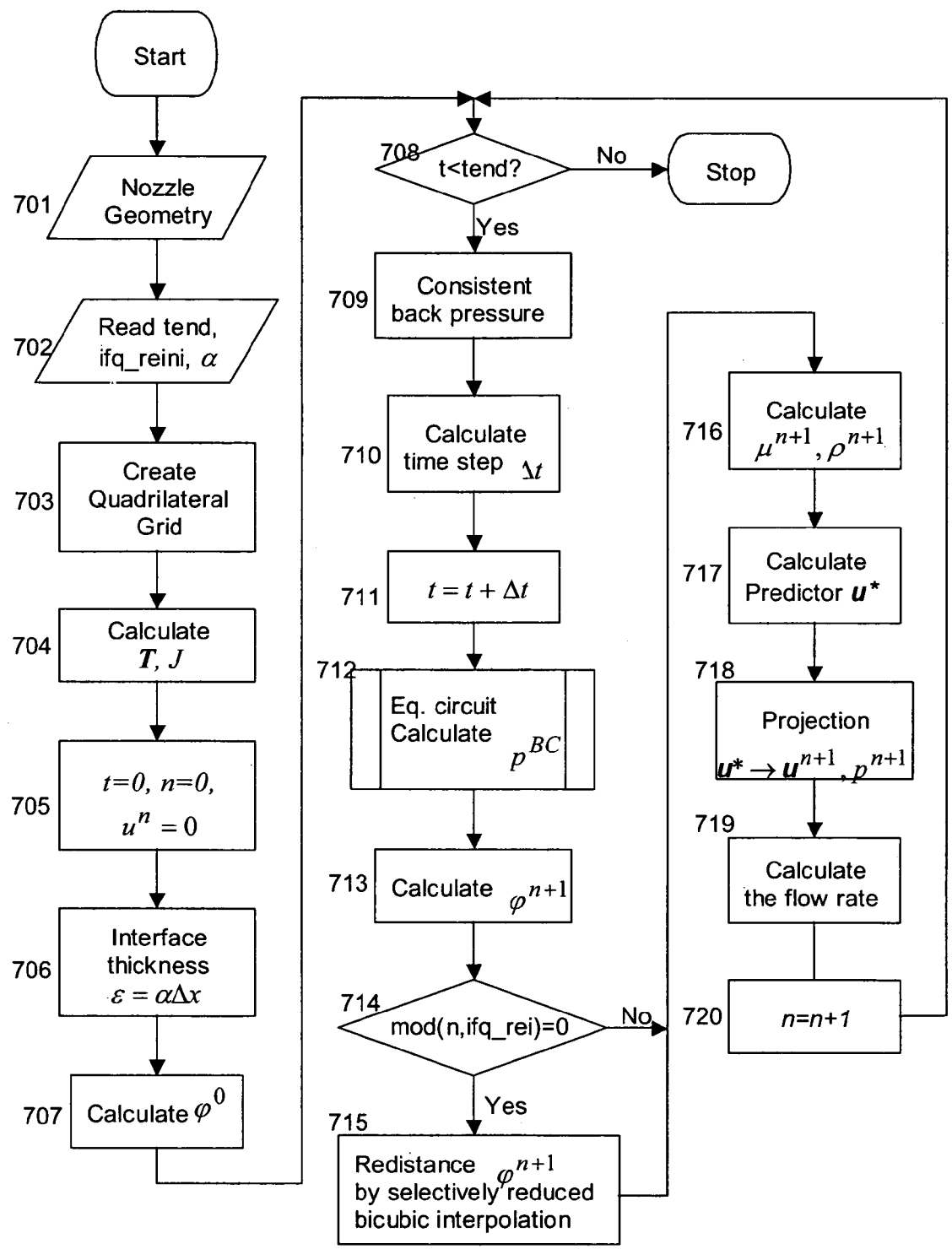
FIG. 7 is a flow chart illustrating a simulation algorithm according to embodiments of the invention.

Various aspects of the invention will now be described with reference to the flow charts of FIGS. 7, 8 and 9. The entire sequential numerical algorithm for simulating ink flow through a nozzle is illustrated in FIG. 7. The computational fluid dynamics or CFD code first instructs the reading of the nozzle geometry (step 701) and also the reading of control parameters such as the end time of the simulation (tend), the extent of the interface smearing ($\alpha$) and how often the level set is re-initialized (ifq_reini) (step 702). Knowing the nozzle geometry, the code directs the creation of a body-fitted quadrilateral grid such as that shown in FIG. 3 (step 703), and calculates the transformation matrix T and the Jacobian J using equation (12) of parent application Ser. No. 10/390,239 (step 704). The time and the number of the current time step are set to zero and the initial fluid velocity is set to zero everywhere (step 705). With the given smearing parameter $\alpha$, the interface thickness is set using equation (35) of the parent application (step 706). The level set is then initialized by assuming the initial ink-air interface is flat (step 707). Now the time loop starts by checking whether t<tend (step 708). If so, the consistent back pressure is determined following the procedure set forth in related application Ser. No. 10/652,386 (step 709). The time step size is then determined by equation (66) of the parent application to ensure the stability of the code (step 710). The time is updated in step 711. The time step size and the ink flow rate (the initial flow rate is zero) are then passed to an equivalent circuit or similar analytic tool, which calculates the inflow pressure for the current time step (step 712). After receiving the inflow velocity from the equivalent circuit, the CFD code instructs the solving of the partial differential equations. The level set is first updated using equation (36) of the parent application (step 713). For every ifq_reini time steps, the level set is re-distanced using the selectively reduced bi-cubic interpolation and triangulated fast marching method (steps 714 and 715). The new fluid viscosity and density are calculated using the new level set values (step 716). The velocity predictor, as given in equation (39) of the parent application, is then calculated in step 717. The predictor velocity is projected into the divergence-free space to get the new pressure and incompressible velocity fields (step 718). The last tasks to carry out in the loop are calculating the ink flow rate (step 719) and updating the number of the time step (step 720). Afterward, the loop returns to step 708, where t is again compared to tend. The loop is repeated as long as t<tend. The algorithm stops when that condition is no longer satisfied.

Figure 8:
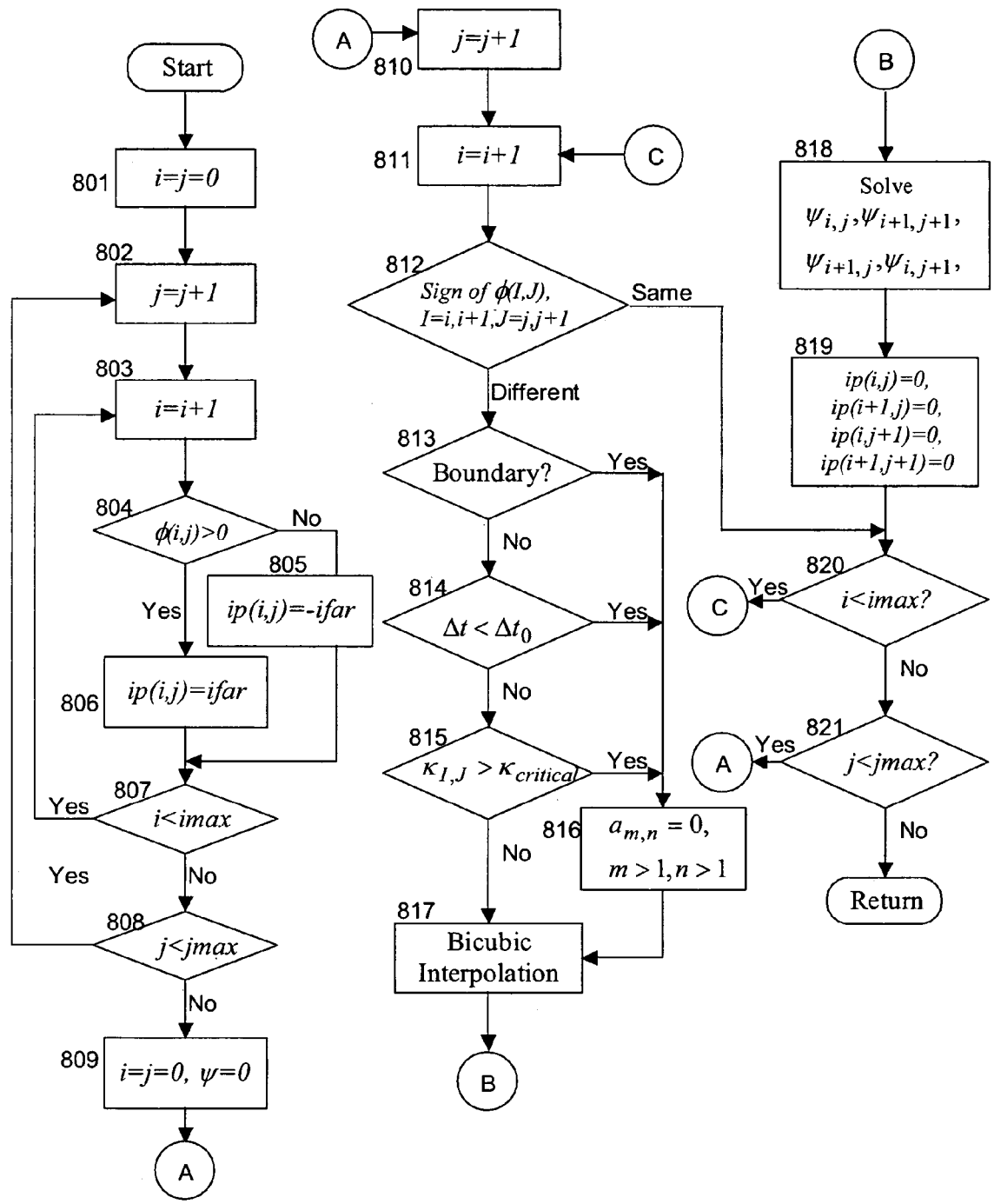
FIG. 8 is a flow chart showing a selectively reduced bi-cubic interpolation portion of the simulation algorithm according to embodiments of the invention.
Figure 9:
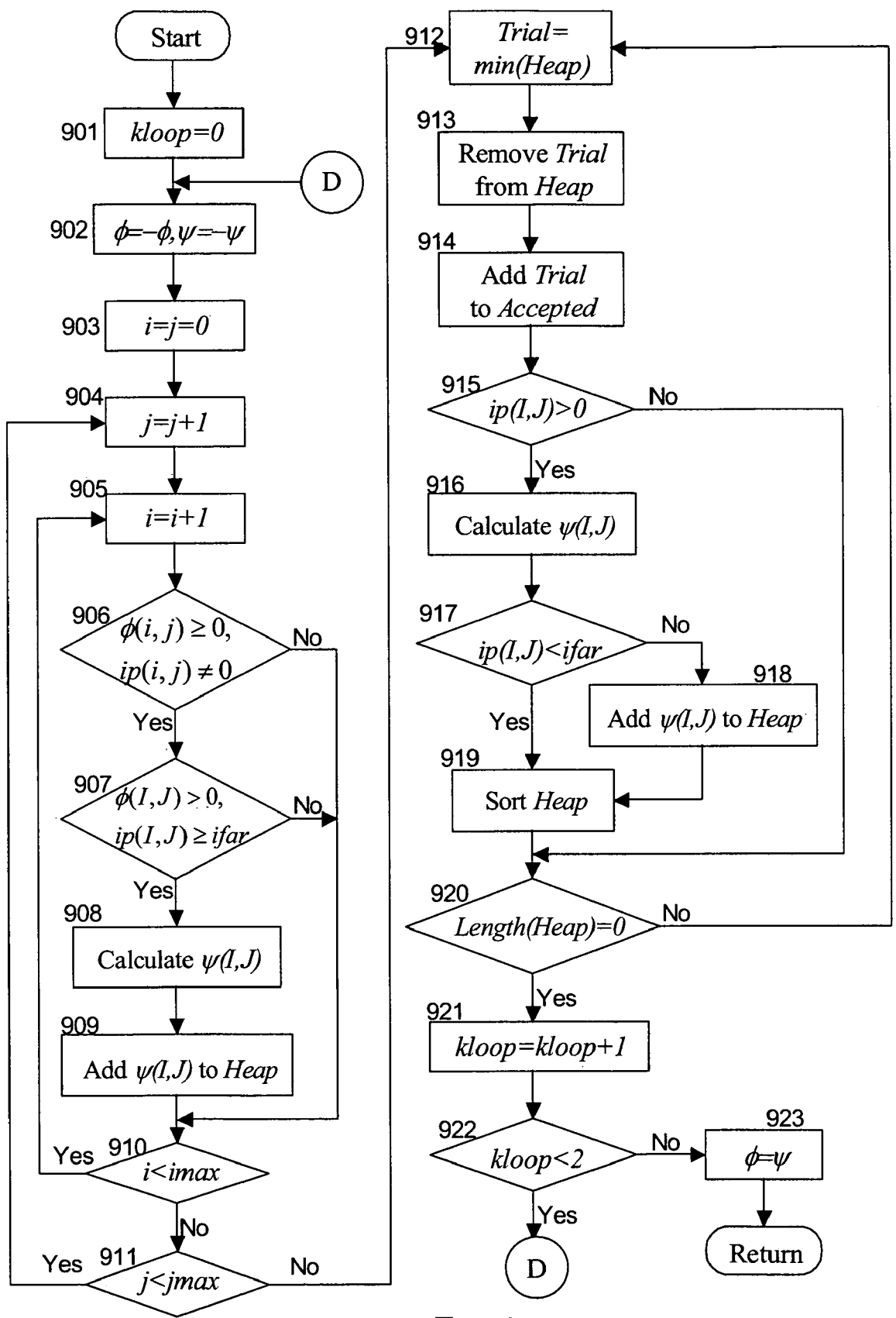
FIG. 9 is a flow chart showing a triangulated fast marching algorithm according to embodiments of the invention.

FIG. 8 illustrates the details of the selectively reduced bi-cubic interpolation algorithm which is carried out in step 715 of FIG. 7. The first column of steps (steps 801 to 808) involve setting up the flag matrix ip, which is used in the fast marching algorithm. The parameter ifar is an integer larger than the total number of nodes. The setup begins with setting i and j to zero (step 801). Two loops follow: an outer loop (steps 802 to 808) for j=1 to j=jmax and an inner loop (steps 803 to 807) for i=1 to i=imax, where imax and jmax are the number of nodes in the r and z directions, respectively. In the loops, the current level set $\phi(i,j)$ is checked (step 804), and ip(i,j) is set to be ifar (step 806) or −ifar (step 805) depending on the sign of $\phi(i,j)$. As will be appreciated, the negative (positive) flag ip(i,j) means the level set value at node (i,j) is negative (positive). The remaining portion of the flow chart is for the bi-cubic interpolation and the calculation of new level set values at nodes within one cell from the interface. This starts with setting i,j and the matrix $\psi$ to zero.

Then there are two loops: an outer loop (steps 810 to 821) for j=1 to j=jmax and an inner loop (steps 811 to 820) for i=1 to i=imax. In the loops, the signs of the four nodal level sets $\phi(i,j),\phi(i+1,j),\phi(i,j+1),\phi(i+1,j+1)$ are first checked (step 812). Steps 813 to 819 are only executed if the four level sets do not have the same sign, which means the interface passes through the cell considered. The next three steps (steps 813 to 815) illustrate the "selectively reduced logic." Checks are made as to whether (1) the cell is right next to the domain boundary (step 813), (2) the time step $\Delta t$ is tighter than the initial time step $\Delta t_0$ (step 814), and (3) any of the four local curvatures $\kappa_{I,J}, I=i,i+1, J=j,j+1$ is higher than the critical value (step 815). If any of the three answers is "yes," the interpolation coefficients $a_{m,n}, m>1, n>1$ are set to zero (step 816), which reduces the bi-cubic interpolation to bi-linear interpolation. The bi-cubic or bi-linear interpolation is done (step 817) according to equations (1) to (8), which is basically a calculation of the coefficients $a_{m,n}, m=0-3, n=0-3$. Note that if step 816 is done, only $a_{m,n}, m=0-1, n=0-1$ are calculated for the bi-linear interpolation. Finally, following the iteration procedure explained in equations (9) to (11), the new nodal level sets are solved from the interpolation polynomial and stored in the matrix $\psi$ (step 818). The corresponding flags ip(I,J),I=i,i+1,J=j,j+1 are then set to zero (step 819), indicating that the level sets at these nodes have been obtained from the interpolation. The fast marching method employed later will not change the level set at nodes with zero ip flags. If i<imax, as determined in step 820, the algorithm returns to step 811. If not, it is determined if j<jmax in step 821; if so, the algorithm returns to step 810; if not, this algorithm ends and control returns to the main algorithm shown in FIG. 7.

The triangulated fast marching algorithm is executed in step 715 of FIG. 7 right after the selectively reduced bi-cubic interpolation to calculate new level set values at nodes that are not within one cell from the interface. The flow chart of FIG. 9 illustrates the triangulated fast marching algorithm. Steps 902 to 922 are executed twice (for kloop=0 and 1). For kloop=0, only those nodes with negative level set values are considered and calculated, while for kloop=1, only those with positive values calculated. The flow chart of FIG. 9 starts with setting the outer loop counter kloop=0 (step 901). The sign of all of the elements in the level set matrix $\phi$ and in the matrix $\psi$ that is used to store the new level sets are changed (step 902). This is to make sure only the nodes with negative (positive) $\phi$ values are considered for the first (second) run. The counters i,j are then set to zero in step 903 to control the two loops from step 904 to step 911. This initializes the "Accepted" and "Considered" sets for fast marching. On a digital computer, the "Considered" set can be stored in a minimum heap, which is denoted Heap in the flow chart. In the two loops, the current level set value $\phi(i,j)$ and flag ip(i,j) at node (i,j) are checked (step 906). If the level set is non-negative and the flag is non-zero, steps 907 to 909 are executed; otherwise, the algorithm proceeds to step 910. Step 907 checks whether the level set $\phi(I,J)$ is greater than zero and the flag ip(I,J) is not less than ifar. If so, the new level set value is calculated in step 908 according to equations (16)–(21) and added to Heap in step 909. If not, the algorithm continues to step 910, where i is compared to imax. If i is less than imax, then i is increased by one in step 905; if not, the algorithm continues to step 911. Step 909 contains two sub-steps, first adding $\psi(i,j)$ to Heap, and second sorting the Heap to maintain it as a minimum heap. The use of capital I and J in steps 907 to 909 denotes that these three steps should be carried out at each of the following six neighbor nodes of (i,j) (except those that are out of bounds): (i+1,j),(i−1,j),(i,j+1),(i,j−1),(i+1,j+1),(i−1,j−1). So, the code first (I,J)=(i+1,j) and if in bounds executes steps 907 to 909, then (I,J)=(i−1,j), and so on. After all such nodes have been considered and processed according to steps 907 to 909, the algorithm continues to step 910. After Heap and the "Accepted" set are initialized, the fast marching starts with calling the minimum element, i.e., the top element, of Heap, Trial (step 912). Trial is removed from Heap (step 913) and added to "Accepted" (step 914). Step 913, like step 909, actually contains two sub-steps: removing $\psi(i,j)$ from Heap; and sorting Heap to maintain it as a minimum heap. All neighbor nodes of Trial are checked one-by-one and steps 915 to 919 are executed. Step 915 checks whether the flag ip(I,J) is positive (since a zero flag means the level set value at that node is accepted and does not need to be updated again). If the decision in step 915 is "no," the next neighbor node is considered for steps 915 to 919. If "yes" for step 915, a new level set value is calculated according to equations (16)–(21) and stored in $\psi(i,j)$ (step 916). The flag ip(I,J) is checked in step 917. If ip(I,J)<ifar, then that means that $\psi(i,j)$ has been added to Heap. So, it is only necessary to sort Heap, which is done in step 919. If ip(I,J)≧ifar, then $\psi(i,j)$ has not been added to Heap. Thus, it is added to Heap in step 918 and Heap is sorted in step 919. In step 920, the length of Heap is checked. If Heap is not empty, the algorithm returns to step 912. Steps 912 to 920 will thus be repeated until Heap is empty. Finally, in steps 921 and 922, the loop counter kloop is incremented by one and then checked to make sure the steps from 902 to 921 are executed twice (for kloop=0 and 1). After two executions, new level set values stored in $\psi$ are copied to $\phi$ (step 923). Then the fast marching algorithm is done and control returns to the main algorithm illustrated in FIG. 7.

V. Effect of the Selectively Reduced Algorithm

Figure 10:
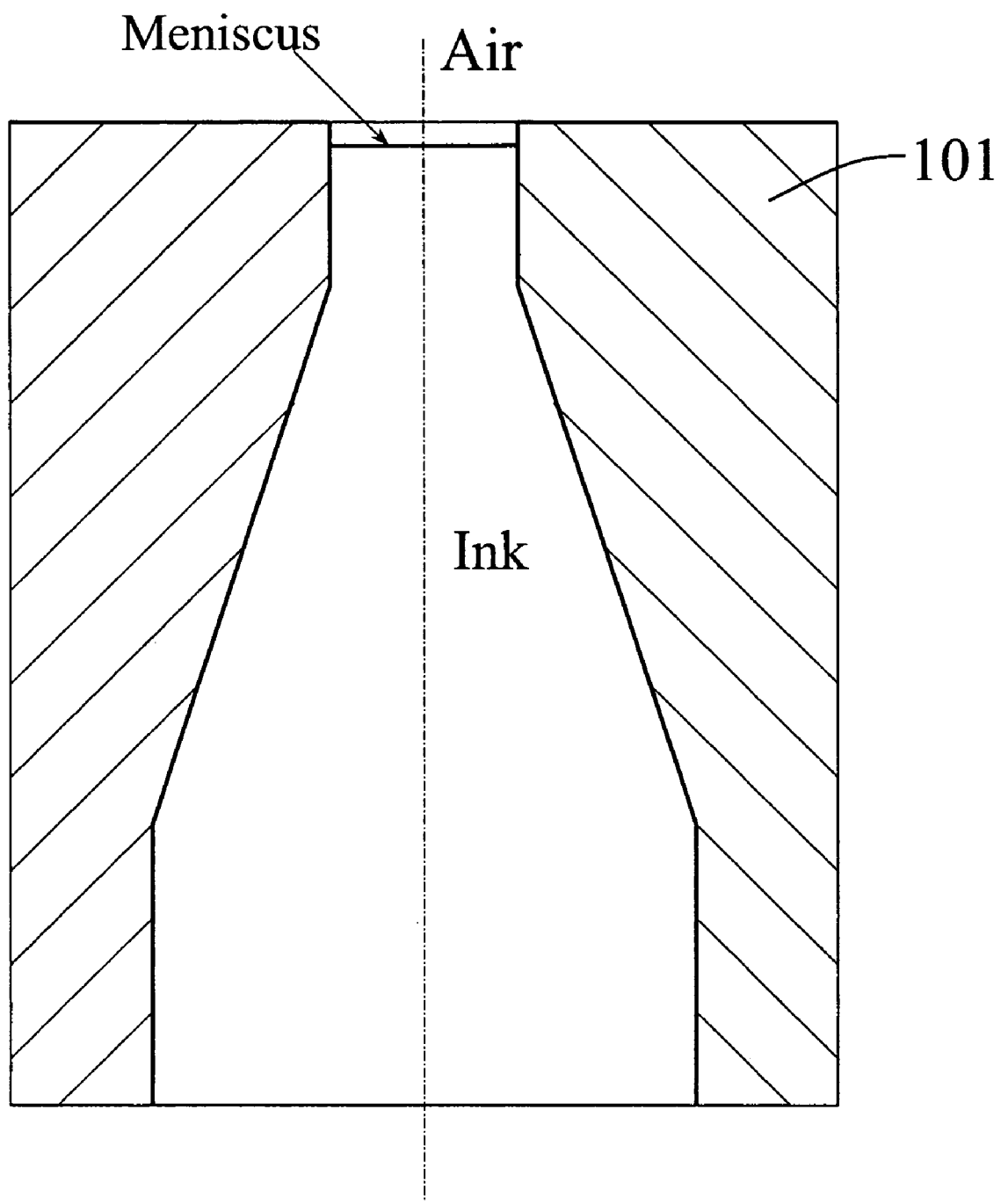
FIG. 10 is a schematic illustration of an ink-jet nozzle.

As an example of ink-jet simulation using the selectively reduced bi-cubic interpolation for level set re-initialization, a small nozzle 101 such as that shown in FIG. 10 and a high viscosity ink are considered. The nozzle diameter is, for example, 8 microns at the opening and 13.5 microns at the bottom. In this example, the length of the nozzle opening portion (i.e., where the diameter is 8 microns) is 5 microns, the length of tapered section is 10 microns, and the length of the bottom portion is 1.5 microns.

Figure 11:
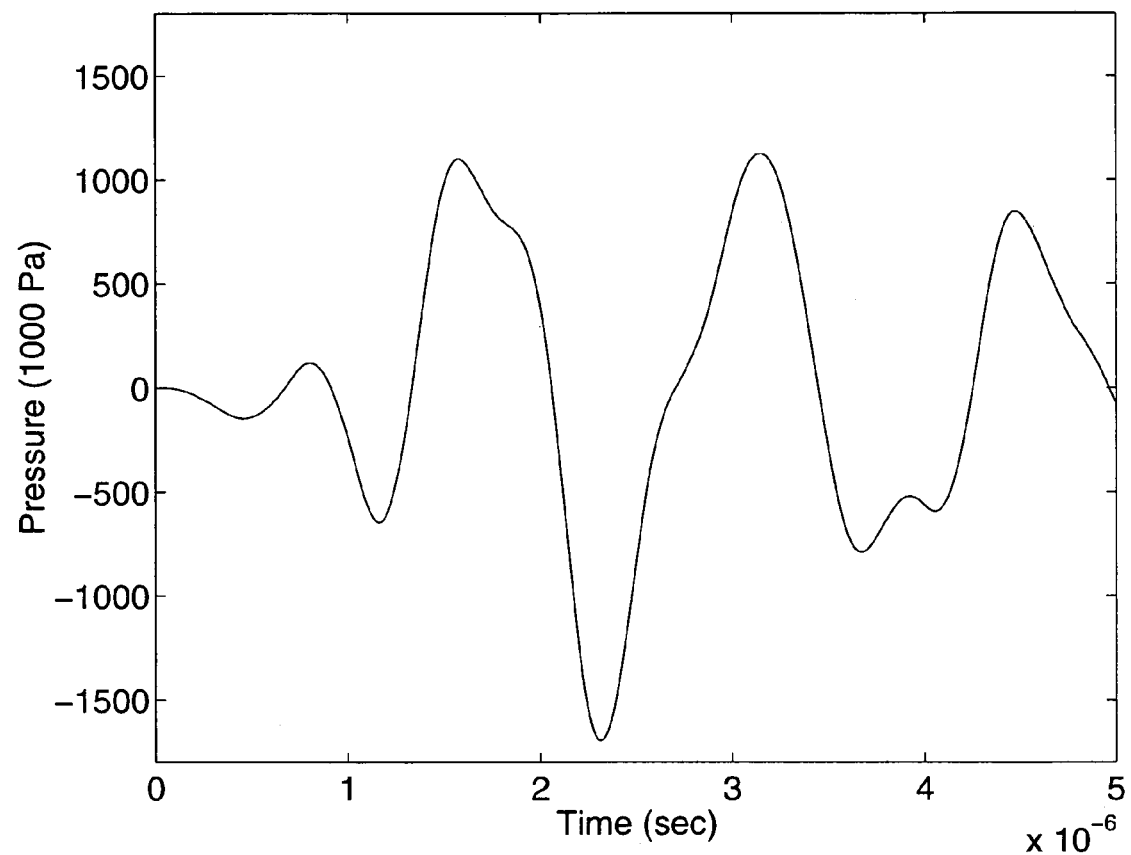
FIG. 11 is a graphical illustration of ink-jet inflow pressure of highly viscous ink with respect to time.

The inflow pressure is given by an equivalent circuit which simulates the effect of the ink cartridge, supply channel, vibration plate, PZT actuator, applied voltage, and the ink inside the channel and cartridge. The inflow pressure varies with time as shown in FIG. 11. The consistent back pressure at the top of the solution domain is calculated as described in related application Ser. No. 10/652,386.

In this example, the solution domain is chosen to be $\{(r,z)|0 \leq r \leq 8.4 \ \mu m, \ 0 \leq z \leq 80 \ \mu m\}$. The advancing and receding critical contact angles are 70° and 20°, respectively. The initial meniscus is assumed to be flat and 0.5 microns under the nozzle opening.

Figure 12:
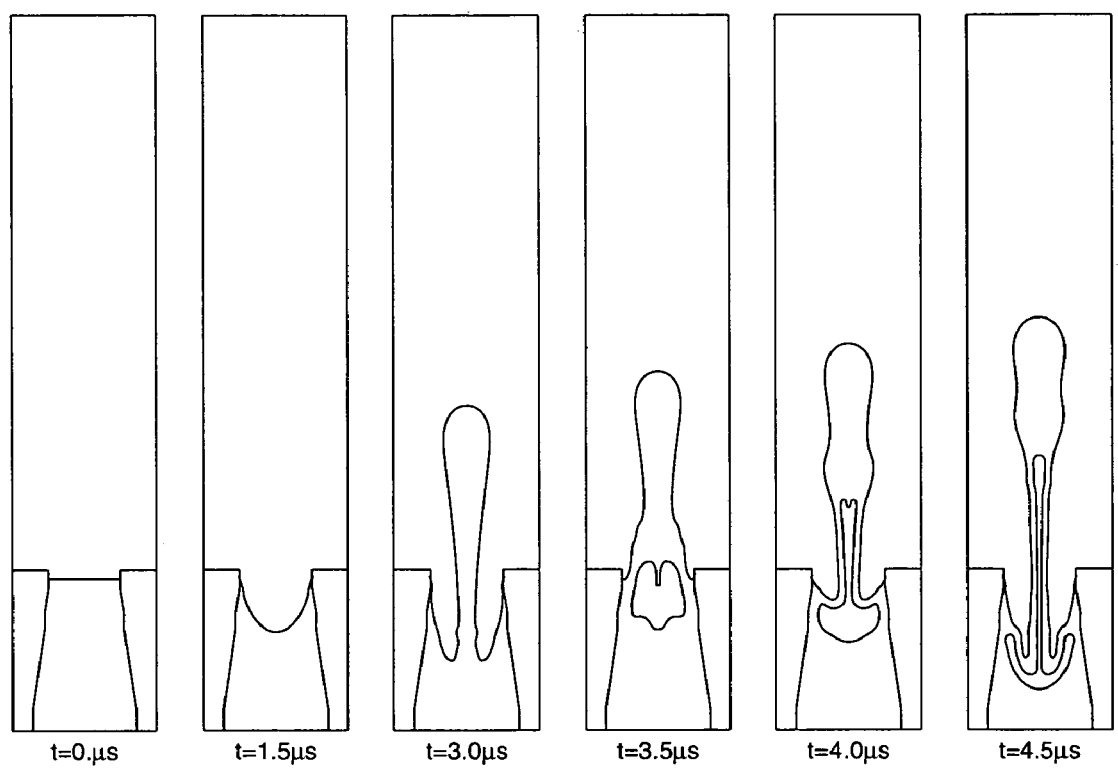
FIG. 12 illustrates simulation of an ejection of a droplet of highly viscous ink in which bi-cubic interpolation was used to re-initialize the level set during the simulation, the simulation covering the period of t=0 µs to t=4.5 µs.
Figure 13:
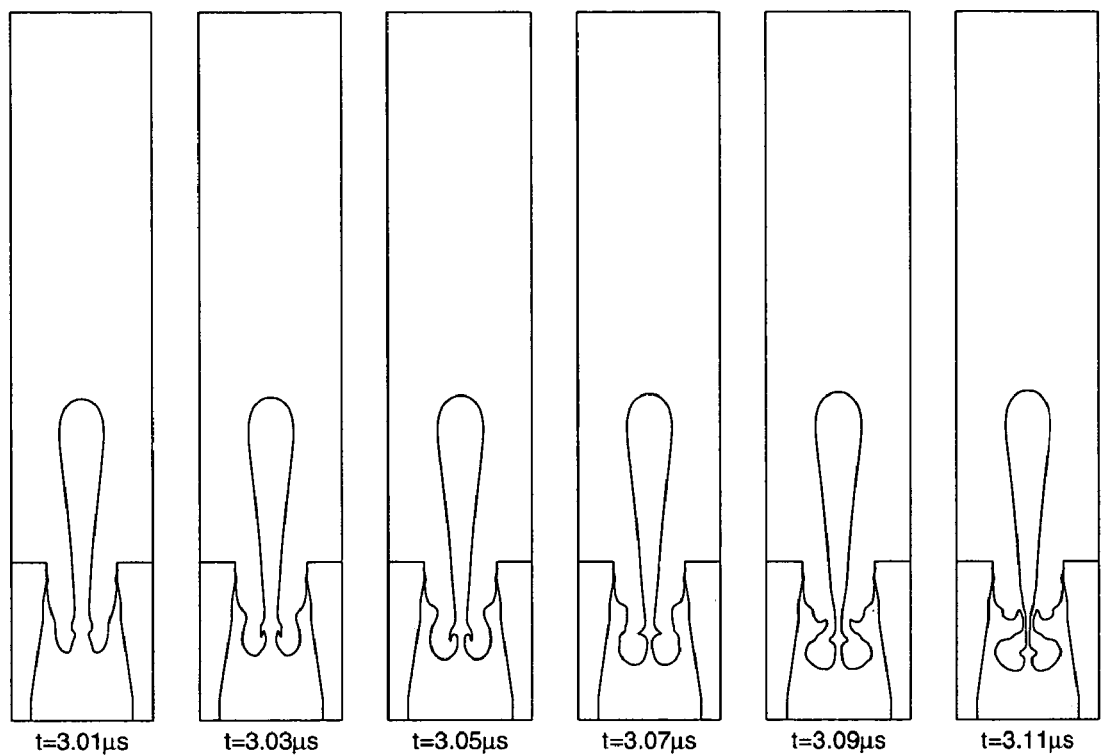
FIG. 13 provides a more detailed view of the simulation in FIG. 12 during the time interval t=3.01 µs to t=3.11 µs to illustrate the instability that forms.
Figure 14:
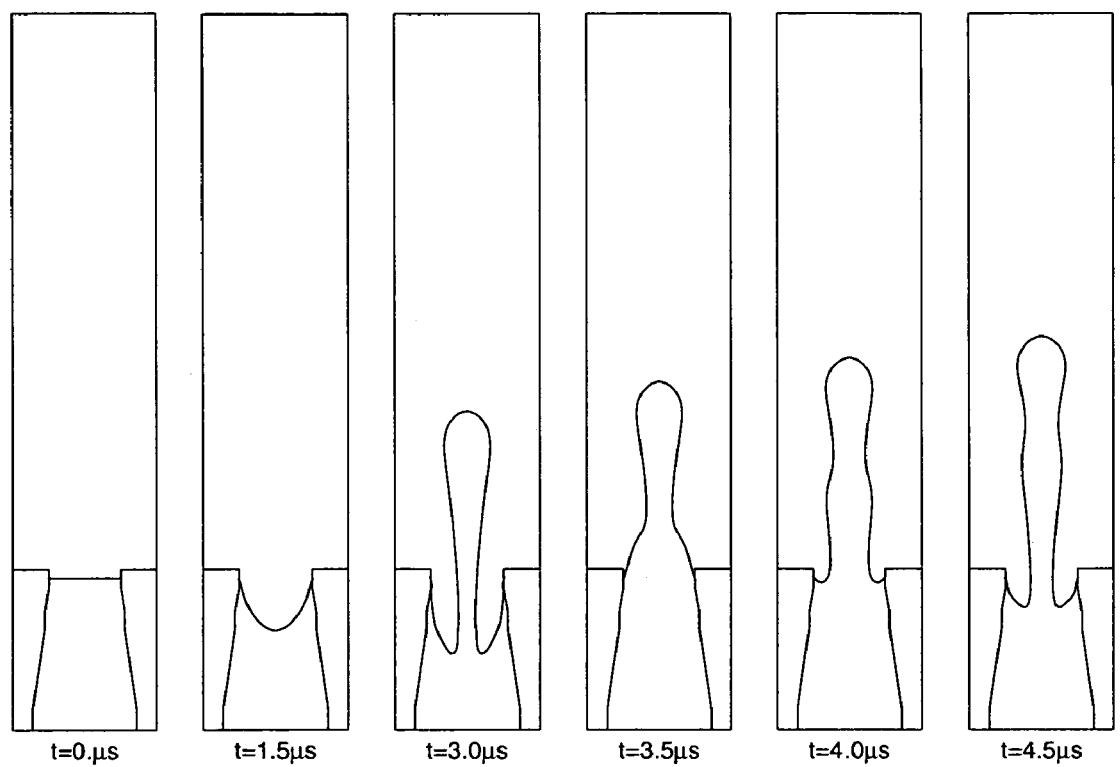
FIG. 14 illustrates the same simulation as that shown in FIG. 12, except that selectively reduced bi-cubic interpolation was used to re-initialize the level set during the simulation.

For the purpose of normalization, the nozzle opening diameter (8 microns) is selected to be the length scale and 6 m/s is selected to be the velocity scale. The normalized solution domain is hence $\{(r,z)|0 \leq r \leq 1.05, \ 0 \leq z \leq 10\}$. Since the density, viscosity, and surface tension of ink are approximately as given in (30), the non-dimensional parameters of (31) are obtained. The initial dimensionless time step is $\Delta t=0.0003$. Simulation results using a 32×272 quadrilateral mesh and the bi-cubic interpolation and fast marching method for level set re-initialization (without the selectively reduced logic at cells with high curvature) are shown in FIG. 12. As can be seen, some instability starts to interfere with the simulation at t=3 μs. The instability cannot be damped by the physical viscosity or the Godunov projection scheme, and develops into a wrong result at t=4.5 μs. The development of the instability is plotted in FIG. 13. The same simulation using the selectively reduced bi-cubic interpolation and fast marching method is plotted in FIG. 14. That figure shows that there is no instability pattern. No droplet is ejected at t=5 μs because the ink is too viscous.

To check the mass conservation performance of the simulation code with the selectively reduced bi-cubic interpolation, the ejection of an ultra small ink droplet is considered. The nozzle used in this simulation has a diameter of 25 microns at the opening and 49.4 microns at the bottom. The length of the nozzle opening portion (i.e., where the diameter is 25 microns) is 25 microns, the length of tapered section is 55 microns, and the length of the bottom portion is 7.5 microns. In this example, the solution domain is chosen to be $\{(r,z)|0 \leq r \leq 37.5 \ \mu m, \ 0 \leq z \leq 488 \ \mu m\}$. The advancing and receding critical contact angles are again 70° and 20°, respectively. The initial meniscus is assumed to be flat and 1 micron under the nozzle opening.

The inflow pressure is again given by an equivalent circuit. The density, viscosity, and surface tension of the ink are approximately as stated in (32). Note that in this example the ink viscosity is much smaller than in the previous example and the nozzle size is much bigger.

Figure 15:
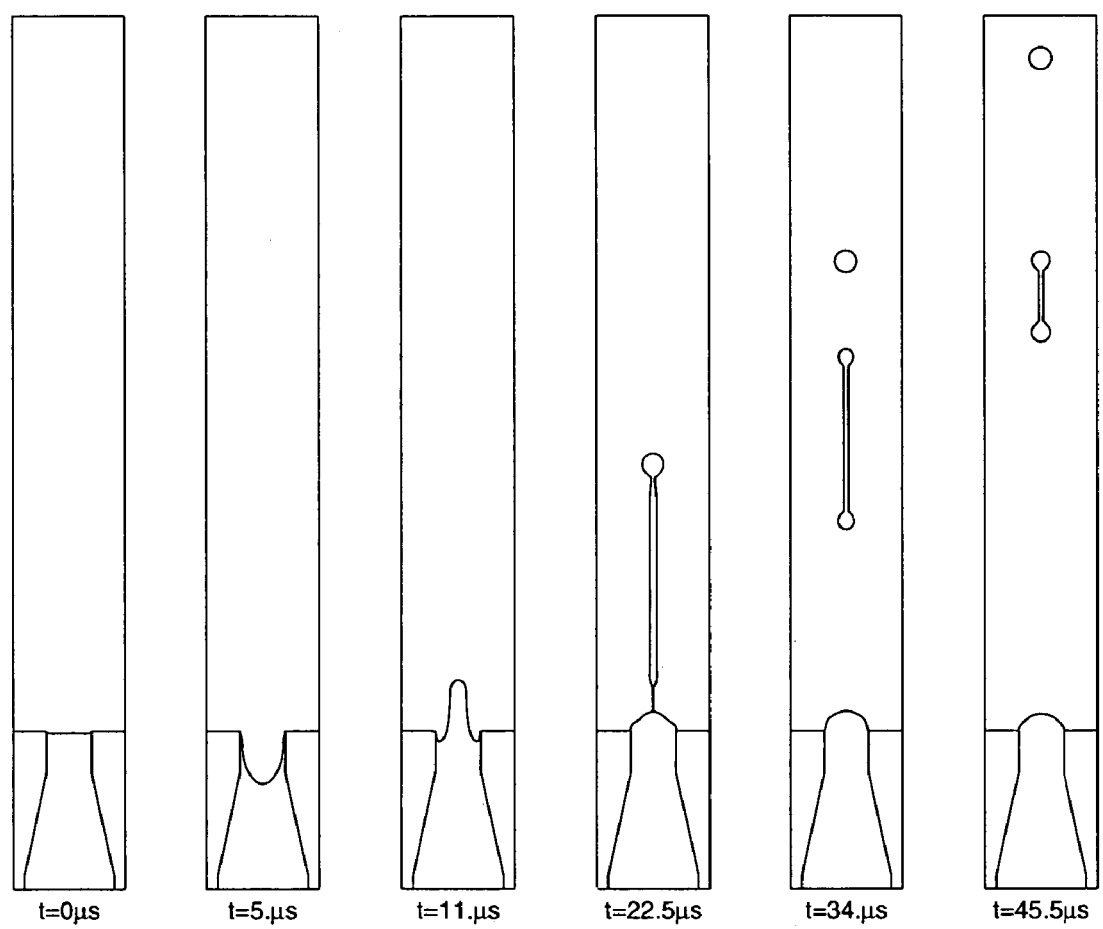
FIG. 15 illustrates simulation of an ejection of an ultra small ink droplet carried out on a quadrilateral mesh using the selectively reduced bi-cubic interpolation.

Simulation result using a 64×864 quadrilateral mesh and the selectively reduced bi-cubic interpolation is shown in FIG. 15. It can be seen that the droplet pinches off at t=22.5 μs and later separates into several smaller droplets. The calculated droplet size at the moment of pinch off is 2.1540 pico liters. It becomes 2.1729 pico liters at t=27.5 μs, a change of 0.88%. If the bi-linear interpolation (or the first arrival time algorithm or the 2D contour plotting algorithm) is used to do level set re-initialization instead of the selectively reduced bi-cubic interpolation, a much bigger change of −4% in volume will occur in the same interval.

VI. Implementations and Effects

The main feature of the simulation model, namely, the selectively reduced bi-cubic interpolation algorithm for re-distancing the level set in ink-jet simulations, provides a more accurate way to simulate and analyze ink ejection that overcomes previously encountered problems. The bi-cubic interpolation feature ensures that the re-distancing procedure does not move the interface (or the zero level) and thereby improves the mass conservation performance. The "selectively reduced" logic prevents this higher-order algorithm from introducing any new instability into the whole simulation algorithm.

Figure 16:
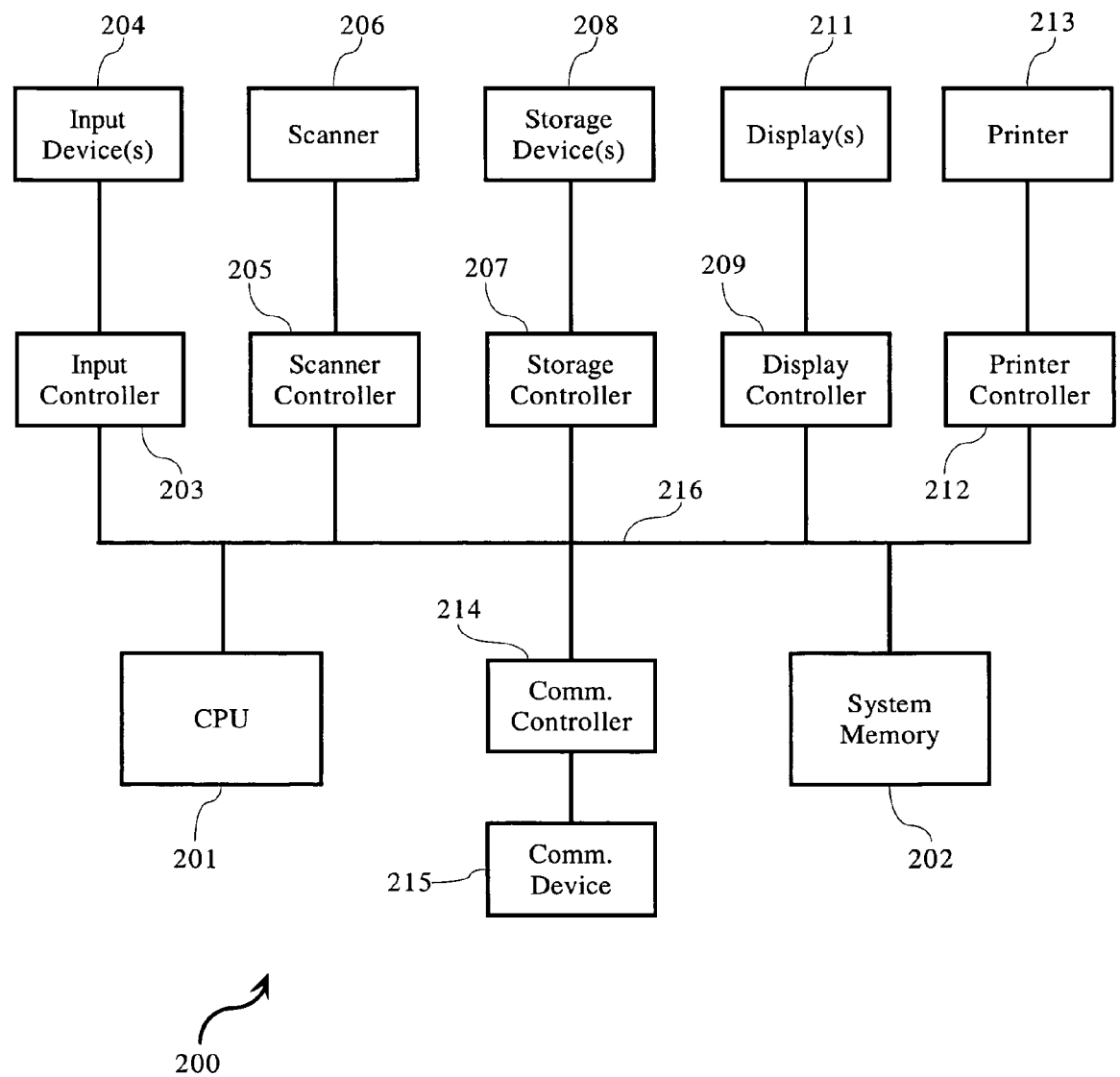
FIG. 16 is a block diagram illustrating an exemplary system which may be used to implement aspects of the present invention.

Having described the details of the invention, an exemplary system 200 which may be used to implement one or more aspects of the present invention will now be described with reference to FIG. 16. As illustrated in FIG. 16, the system includes a central processing unit (CPU) 201 that provides computing resources and controls the computer. CPU 201 may be implemented with a microprocessor or the like, and may also include a graphics processor and/or a floating point coprocessor for mathematical computations. System 200 further includes system memory 202 which may be in the form of random-access memory (RAM) and read-only memory (ROM).

A number of controllers and peripheral devices are also provided, as shown in FIG. 16. Input controller 203 represents an interface to various input devices 204, such as a keyboard, mouse or stylus. There is also a controller 205 which communicates with a scanner 206. A storage controller 207 interfaces with one or more storage devices 208 each of which includes a storage medium such as magnetic tape or disk, or an optical medium that may be used to record programs of instructions for operating systems, utilities and applications which may include embodiments of programs that implement various aspects of the present invention. Storage device(s) 208 may also be used to store processed or data to be processed in accordance with the invention. A display controller 209 provides an interface to a display device 211 which may be a cathode ray tube (CRT) or thin film transistor (TFT) display. A printer controller 212 is also provided for communicating with a printer 213. A communications controller 214 interfaces with one or more communication devices 215 which enables system 200 to connect to remote devices through any of a variety of networks including the Internet, a local area network (LAN), a wide area network (WAN), or through any suitable electromagnetic carrier signals including infrared signals.

In the illustrated system, all major system components connect to bus 216 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

The present invention may be conveniently implemented with software. However, alternative implementations are certainly possible, including a hardware and/or a software/hardware implementation. Any hardware-implemented functions may be realized using ASIC(s), digital signal processing circuitry, or the like. Accordingly, "means" and "module(s)" in the claims are intended to cover both software and hardware implementations. Similarly, the term "machine-readable medium" as used herein includes software, hardware having a program of instructions hardwired therein, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

$$f(r,z) = \sum_{m=0}^{3}\sum_{n=0}^{3} a_{m,n} r^m z^n, \tag{1}$$

$$f_{k,l} = [f(r,z)]_{k,l} = \phi_{k,l}, \tag{2}$$

$$\left(\frac{\partial f}{\partial r}\right)_{k,l} = \left(\frac{\partial \phi}{\partial r}\right)_{k,l},$$

$$\left(\frac{\partial f}{\partial z}\right)_{k,l} = \left(\frac{\partial \phi}{\partial z}\right)_{k,l},$$

$$\left(\frac{\partial^2 f}{\partial r \partial z}\right)_{k,l} = \left(\frac{\partial^2 \phi}{\partial r \partial z}\right)_{k,l},$$

$$k = i, i+1, \quad l = j, j+1, \tag{3}$$

$$T_{i,j}^T = \begin{pmatrix} z_{,\eta} & -z_{,\xi} \\ -r_{,\eta} & r_{,\xi} \end{pmatrix}_{i,j}, \quad J_{i,j} = (r_{,\xi} z_{,\eta} - r_{,\eta} z_{,\xi})_{i,j}, \tag{4}$$

$$\left(\frac{\partial \phi}{\partial r} \frac{\partial \phi}{\partial z}\right)_{i,j} = J_{i,j}^{-1} T_{i,j}^T \begin{pmatrix} \frac{\partial \phi}{\partial \xi} \\ \frac{\partial \phi}{\partial \eta} \end{pmatrix}_{i,j}, \tag{5}$$

$$\left(\frac{\partial \phi}{\partial \xi}\right)_{i,j} = (\phi_{i+1,j} - \phi_{i-1,j})/2, \tag{6}$$

$$\left(\frac{\partial \phi}{\partial \eta}\right)_{i,j} = (\phi_{i,j+1} - \phi_{i,j-1})/2$$

$$\frac{\partial^2 \phi}{\partial r \partial z} = (\phi_{,r})_{,\xi}\xi_{,z} + (\phi_{,r})_{,\eta}\eta_z \tag{7}$$
$$= \phi_{,\xi\xi}\xi_{,r}\xi_{,z} + \phi_{,\xi\eta}(\xi_{,z}\eta_{,r} + \xi_{,r}\eta_{,z}) + \phi_{,\eta\eta}\eta_{,r}\eta_{,z},$$

$$\phi_{,\xi\xi} = \phi_{i+1,j} - 2\phi_{i,j} + \phi_{i-1,j}, \tag{8}$$
$$\phi_{,\eta\eta} = \phi_{i,j+1} - 2\phi_{i,j} + \phi_{i,j-1},$$
$$\phi_{,\xi\eta} = (\phi_{i+1,j+1} - \phi_{i-1,j+1} - \phi_{i+1,j-1} + \phi_{i-1,j-1})/4,$$

$$f(y) = 0, \quad \nabla f(y) \times x^0 - y) = 0, \tag{9}$$

$$\delta_1 = -f(x^k)\frac{\nabla f(x^k)}{\nabla f(x^k) \cdot \nabla f(x^k)}, \tag{10}$$

$$x^{k+1/2} = x^k + \delta_1,$$

$$\delta_2 = (x^0 - x^k) - \frac{(x^0 - x^k) \cdot \nabla f(x^k)}{\nabla f(x^k) \cdot \nabla f(x^k)}\nabla f(x^k),$$

$$x^{k+1} = x^{k+1/2} + \delta_2,$$

where $k = 0, 1, 2, \ldots$.

$$|\delta_1|^2 + |\delta_2|^2 < 10^{-6}\Delta r \Delta z, \tag{11}$$

$$f(r,z) = \sum_{m=0}^{1}\sum_{n=0}^{1} a_{m,n} r^m z^n, \tag{12}$$

$$|\nabla \phi| = 1, \tag{13}$$

$$\max(D_{ij}^{-x}\phi, -D_{ij}^{+x}\phi, 0)^2 + \max(D_{ij}^{-y}\phi, -D_{ij}^{+y}\phi, 0)^2 = 1, \tag{14}$$

$$D_{ij}^{-x}\phi = \frac{\phi_{i,j} - \phi_{i-1,j}}{\Delta x}, \tag{15}$$

$$(a^T Q a)\phi^2 + (2a^T Q b)\phi + (b^T Q b) = 1, \tag{16}$$

-continued $$Q = (PP^T)^{-1}, \quad (17)$$

$$P = \begin{pmatrix} P_1 \\ P_2 \end{pmatrix},$$

$$P_1 = (x - x_A)/|x - x_A|,$$

$$P_2 = (x - x_B)/|x - x_B|,$$

$$a = (a_1 \ a_2) = \left(\frac{1}{s_1} \ \frac{1}{s_2}\right),$$

$$b = (b_1 \ b_2) = \left(-\frac{\phi_A}{s_1} \ -\frac{\phi_B}{s_2}\right),$$

$$(a_1\phi + b_1) \geq (P_1 \cdot P_2^T)(a_2\phi + b_2), \quad (18)$$

$$(a_2\phi + b_2) \geq (P_1 \cdot P_2^T)(a_1\phi + b_1),$$

$$P\nabla\phi = v, \quad v = (v_1 \ v_2), \quad (19)$$

$$(P^{-1}v) \cdot (P^{-1}v) = 1, \text{ or} \quad (20)$$

$$(P^{-1}v)^T \cdot (P^{-1}v) = 1, \text{ or}$$

$$v^T(PP^T)^{-1}v = 1,$$

$$v_1 = (\phi - \phi_A)/s_1, \quad v_2 = (\phi - \phi_B)/s_2, \quad (21)$$

$$\Delta t < \quad (22)$$

$$\min_{i,j}\left[\frac{\Delta r}{u}, \frac{\Delta z}{v}, \sqrt{We\frac{\rho_1 + \rho_2}{8\pi}} h^{3/2}, \frac{Re}{2}\frac{\rho^n}{\mu^n}\left(\frac{1}{\Delta r^2} + \frac{1}{\Delta z^2}\right)^{-1}, \sqrt{\frac{2h}{|F|}}\right],$$

$$\Delta t_0 < \quad (23)$$

$$\min_{i,j}\left[\sqrt{We\frac{\rho_1 + \rho_2}{8\pi}} h^{3/2}, \frac{Re}{2}\frac{\rho^n}{\mu^n}\left(\frac{1}{\Delta r^2} + \frac{1}{\Delta z^2}\right)^{-1}\right],$$

$$\Delta t' < \min_{i,j}\left[\frac{\Delta r}{u}, \frac{\Delta z}{v}, \sqrt{\frac{2h}{|F|}}\right], \quad (24)$$

$$\Delta t = \min(\Delta t_0, \Delta t'), \quad (25)$$

$$\kappa(\phi) = J^{-1}\nabla_\Xi \cdot \left(gT\frac{T^T\nabla_\Xi\phi}{|T^T\nabla_\Xi\phi|}\right), \quad (26)$$

$$\nabla_\Xi\phi = \left(\frac{\phi_{i+1,j} - \phi_{i-1,j}}{2}, \frac{\phi_{i,j+1} - \phi_{i,j-1}}{2}\right), \quad (27)$$

$$\kappa_{critical} = 1.d0/\epsilon, \quad (28)$$

$$\kappa(\phi)_{i,j}, \kappa(\phi)_{i+1,j}, \kappa(\phi)_{i,j+1}, \text{ or } \kappa(\phi)_{i+1,j+1} > \kappa_{critical}, \quad (29)$$

$$\rho_1 = 1000 \text{ Kg/m}^3, \quad (30)$$

$$\mu_1 = 10. \times 10^{-3} \text{ Kg/m·sec}, \quad \sigma = 0.032 \text{ Kg/sec}^2,$$

$$Re = 4.8, \quad We = 9.6 \quad (31)$$

$$\rho_1 = 1070 \text{ Kg/m}^3, \quad (32)$$

$$\mu_1 = 3.5 \times 10^{-3} \text{ Kg/m·sec}, \quad \sigma = 0.032 \text{ Kg/sec}^2.$$

What is claimed is:

1. A method for simulating and analyzing fluid ejection from a channel having a boundary between a first fluid that flows through, and is ejected from, the channel and a second fluid, the method comprising:
   simulating the ejection of the first fluid from the channel using a level set projection algorithm that includes
   (1) creating a quadrilateral grid in a physical space, comprising a plurality of nodes at the intersections of the quadrilateral grid,
   (2) calculating a transformation matrix for transforming equations derived with respect to the quadrilateral grid for application to a uniform square grid in a computational space, the uniform square grid comprising a plurality of nodes at the intersections of the uniform square grid,
   (3) solving equations governing the first and second fluids including creating a level set representative of the boundary, and
   (4) re-distancing the level set, periodically during the simulation, by performing selectively reduced bi-cubic interpolation.

2. A method as recited in claim 1, wherein the first fluid is ink, the second fluid is air, and the channel is representative of an ink-jet nozzle designed to be part of a piezoelectric ink-jet head.

3. A method as recited in claim 2, wherein the ejection simulating step further comprises, after creating step (1), calculating step (2) and solving step (3):
   initializing time, current time step number, and velocity of the first fluid, and setting an interface thickness variable,
   initializing the level set for the ink-air interface, and
   calculating an inflow pressure of the ink for the current time step.

4. A method as recited in claim 3, wherein the ejection simulating step further comprises, after solving step (3) and before re-distancing step (4), updating the level set.

5. A method as recited in claim 1, wherein at least one of the grids comprises a plurality of cells, and the re-distancing step (4) performed by selectively reduced bi-cubic interpolation comprises calculating new level set values at each node within one cell from an interface between the first and second fluids.

6. A method as recited in claim 5, wherein the re-distancing step (4) further comprises calculating new level set values at each node not within one cell from the interface using a triangulated fast marching method.

7. An apparatus for simulating and analyzing fluid ejection from a channel having a boundary between a first fluid that flows through, and is ejected from, the channel and a second fluid, the apparatus comprising:
   means for simulating the ejection of the first fluid from the channel using a level set projection algorithm that includes modules configured to
   create a quadrilateral grid in a physical space, comprising a plurality of nodes at the intersections of the quadrilateral grid,
   calculate a transformation matrix for transforming equations derived with respect to the quadrilateral grid for application to a uniform square grid in a computational space, the uniform square grid comprising a plurality of nodes at the intersections of the uniform square grid,
   solve equations governing the first and second fluids, and
   re-distance, periodically during the simulation, the level set for the first and second fluids by performing selectively reduced bi-cubic interpolation.

8. An apparatus as recited in claim 7, wherein the first fluid is ink, the second fluid is air, and the channel is representative of an ink-jet nozzle designed to be part of a piezoelectric ink-jet head.

9. An apparatus as recited in claim 8, wherein the ejection simulating means further comprises modules configured to
   initialize time, current time step number, and velocity of the first fluid, and set an interface thickness variable,
   initialize the level set for the ink-air interface, and calculate an inflow pressure of the ink for the current time step, and update the level set.

10. An apparatus as recited in claim 7, wherein at least one of the grids comprises a plurality of cells, and the selectively reduced bi-cubic interpolation performed by the re-distance module is used to calculate new level set values at each node within one cell from an interface between the first and second fluids.

11. An apparatus as recited in claim 10, wherein the re-distance module is further configured to calculate new level set values at each node not within one cell from the interface using a triangulated fast marching method.

12. An apparatus as recited in claim 7, wherein the simulating means comprises a program of instructions embodied in software, hardware, or combination thereof.

13. An apparatus as recited in claim 7, wherein the simulating means comprises a display for visually observing the simulation.

14. A machine-readable medium having a program of instructions for directing a machine to perform a method for simulating and analyzing fluid flow ejection from a channel having a boundary between a first fluid that flows through, and is ejected from, the channel and a second fluid, the program of instructions comprising instructions for:

simulating the ejection of the first fluid from the channel using a level set projection algorithm that includes instructions for (1) creating a quadrilateral grid in a physical space, comprising a plurality of nodes at the intersections of the quadrilateral grid, (2) calculating a transformation matrix for transforming equations derived with respect to the quadrilateral grid for application to a uniform square grid in a computational space, the uniform square grid comprising a plurality of nodes at the intersections of the uniform square grid, (3) solving equations governing the first and second fluids, and (4) re-distancing, periodically during the simulation, the level set for the first and second fluids by performing selectively reduced bi-cubic interpolation.

15. A machine-readable medium as recited in claim 14, wherein the first fluid is ink, the second fluid is air, and the channel is representative of an ink-jet nozzle designed to be part of a piezoelectric ink-jet head.

16. A machine-readable medium as recited in claim 15, wherein the ejection simulating instruction further comprises, after creating instruction (1), calculating instruction (2) and solving instruction (3):

instructions for initializing time, current time step number, and velocity of the first fluid, and setting an interface thickness variable, initializing the level set for the ink-air interface, and calculating an inflow pressure of the ink for the current time step.

17. A machine-readable medium as recited in claim 16, wherein the ejection simulating instruction further comprises, after solving instruction (3) and before re-distancing instruction (4), an instruction for updating the level set.

18. A machine-readable medium as recited in claim 14, wherein at least one of the grids comprises a plurality of cells, and the re-distancing instruction (4) performed by selectively reduced bi-cubic interpolation comprises an instruction for calculating new level set values at each node within one cell from an interface between the first and second fluids.

19. A machine-readable medium as recited in claim 18, wherein the re-distancing instruction (4) further comprises instructions for calculating new level set values at each node not within one cell from the interface using a triangulated fast marching method.

* * * * *